May 21, 1935. H. S. WALKER 2,002,068
UNDERFLOOR DUCT SYSTEM
Filed Jan. 4, 1934
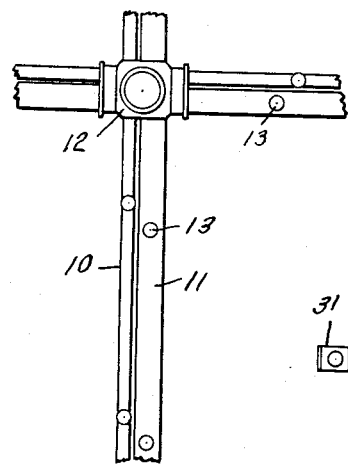
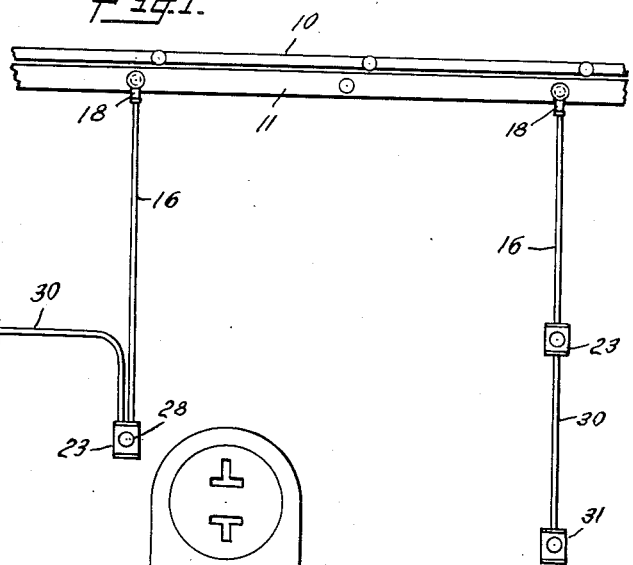
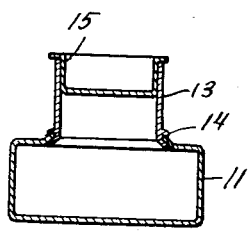
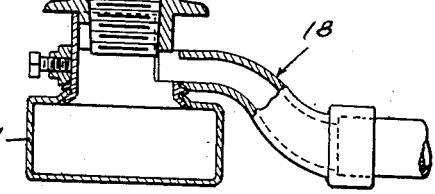
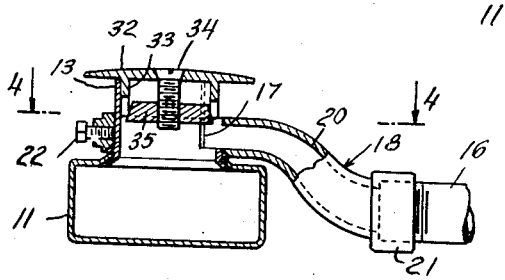
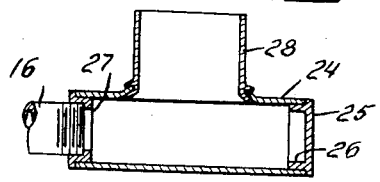
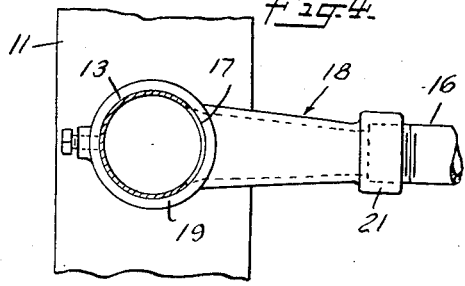
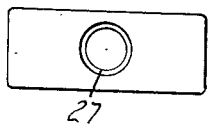
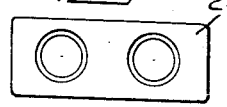
INVENTOR
Hervey S. Walker
BY
ATTORNEYS Patented May 21, 1935

2,002,068

UNITED STATES PATENT OFFICE 2,002,068

UNDER FLOOR DUCT SYSTEM

Hervey S. Walker, Ardmore, Pa.

Application January 4, 1934, Serial No. 705,212

5 Claims. (Cl. 247—28)

This invention relates to electrical wiring systems of the concealed type, such as are now commonly installed in the floors of office and similar buildings and include wiring ducts disposed within the floor structure and provided with outlets at suitable points leading from the ducts to the floor surface. More particularly, the invention is concerned with a novel underfloor duct system which includes runs of duct provided with outlets and extensions or branches from the ducts by which wiring may be conducted to points remote from the ducts. These extensions do not interfere with the normal use of the ducts and may be connected to the system with little expense for labor and materials. The extensions increase the floor area that may be served by the ducts without adding substantially to the cost of the system.

Underfloor duct systems as now commonly installed in office and similar buildings include runs of duct usually laid out in a network with junction boxes at the places where the runs intersect and the parallel runs spaced apart a distance determined by the requirements of the prospective tenants for electrical service. The service connections are made to the wiring in the ducts through outlets, either of the pre-set type, which are mounted in the ducts prior to their installation into the floor, or of the after-set type, which are installed in the ducts after the floor is completed by making openings in the floor to expose the ducts. In systems of both types, service is intended to be afforded only directly from the ducts and if a demand for service arises at a point remote from the ducts, it has been supplied heretofore either by leading the wiring from an outlet along a baseboard or wall, by installing a conduit to the desired point, either from a junction box or from a special fitting which is substituted for a short section of duct.

Neither of the methods referred to for supplying service to points remote from the ducts is entirely satisfactory, since in the first instance, a portion of the wiring is exposed, while when a conduit is led from a box, the conduit is threaded into an opening in the box provided for the admission of supply wiring to the box, and this may interfere with the normal use of the system. Also, as the boxes are placed only where the runs of duct intersect, the box nearest to the point where service is required may be a substantial distance away and may be considerably farther from the service point than the nearest point on the duct. While the special fittings referred to are satisfactory in general, their use requires that the duct be cut either before or after installation, and this may be objectionable.

The present invention is accordingly directed to the provision of a novel underfloor duct system which is highly flexible with respect to its capacity to meet demands for electrical service at points remote from the duct and with the new system, service can be supplied at such points without the necessity of employing exposed wiring, utilizing openings in the junction boxes provided for supply wiring, or cutting the duct. Such extensions in the new system are made from the outlets and thus the extensions may be of the minimum length necessary and by the use of a special fitting which forms a part of the new system, such extensions in no way interfere with the normal use of the outlet for supplying service at the duct itself.

The new system includes ducts preferably of the rectangular steel type and provided with pre-set outlets in the form of tubular inserts mounted in openings in the duct wall at short intervals. These ducts are installed in the floor in the usual way prior to completion of the floor structure and the runs of duct are placed as close together as is economical in view of the demands for service that are expected to arise. To meet demands which cannot be supplied by the duct outlets, extensions from these outlets are used and each extension includes a fitting which can be connected to the outlet and has a wiring passage through it. Prior to the attachment of the fitting to the outlet, a lateral opening is cut in the outlet and the fitting is placed in position so that its wiring passage communicates with the outlet through the opening in the latter. A length of conduit is then installed to lead from the fitting to the service point and at the end of the conduit is placed an outlet box which has an outlet opening through the floor surface. While this outlet box may take various forms, I provide as a feature of the invention, a box of simple inexpensive construction which consists of a short section of pre-set duct having an outlet at its top. The ends of the section are closed by suitable plates and one or both of these plates may have openings into which the conduit may be threaded. The fitting, the conduit, and outlet box all lie beneath the floor surface and may be installed either prior to the completion of the floor or in a trench excavation after the floor is finished, the extension then being covered with floor material to restore the floor surface.

The extension from the outlet as described may be used either with systems, of the pre-set or after-set types, but pre-set systems are preferred because the ducts are provided with outlets before installation and the lateral openings in the outlets may be made with a few simple operations. Accordingly, the invention will be described in the form of a pre-set system similar to that disclosed in my Patent No. 1,592,548, issued January 13, 1926.

For a better understanding of the invention, reference may be had to the accompanying drawing, in which Fig. 1 is a plan view of a portion of the new duct system;

Fig. 2 is a vertical sectional view through one of the outlets;

Fig. 3 is a view in vertical section and partly in elevation showing a portion of an extension;

Fig. 4 is a sectional view on the line 4—4 of Fig. 3;

Fig. 5 is a view in vertical section and partly in elevation showing a stand-pipe mounted in an outlet from which an extension leads;

Fig. 6 is a view in vertical section and partly in elevation showing a new outlet box used in the new system; and Figs. 7 and 8 are face views of details of the new outlet box.

The present system illustrated has two steel ducts in each run, one of the ducts 10 being of square section and the other duct 11 of oblong section. The ducts are placed in the floor in runs extending in the desired directions; and at the intersections of the runs, junction boxes 12 of suitable construction are used. The ducts are supported on the rough floor slab in mountings, and in the completion of the floor structure, filling material is placed over and around the ducts and the floor finished by the usual layer of cement mortar. Each duct is provided with outlets 13 which are preferably in the form of tubular inserts mounted in openings at the top of the duct in any convenient manner, as by means of spaced flanges illustrated at 14, the outlets being spaced at short uniform intervals. The outlets extend through the floor material and terminate substantially flush with the finished floor surface, although in some installations, the level of the floor material is slightly above the top of the outlets. The outlets, upon installation, are closed by caps 15, which are removed when service connections are made, and many more outlets are provided than are required in normal use, so that service to all points on the floor in the vicinity of the ducts may be supplied without the necessity of cutting into the ducts.

The runs of ducts are laid out in a network with the parallel runs spaced apart a distance determined by the requirements on the floor for electrical service, and with the runs so arranged, most of the points requiring service may be reached directly by the ducts. Frequently, however, it is necessary to provide service at points remote from the runs of duct, as for example, on a wall, and in these cases, it is not desirable to lead the wiring from the nearest outlet along a baseboard or wall, or to extend the whole system of ducts to those points.

In the new system, demands for service at the points referred to are met by running extensions in the form of conduits 16 from the ducts, these extensions being connected to the ducts through the outlets 13. After the network of ducts has been laid on the floor, the outlet in the system which is nearest the point where the service is required is determined, and the cap 15 of the outlet removed. A suitable opening 17 is then cut in the side of the outlet facing the point, and this opening may be made by cutting a slot extending down from the top of the insert. A connection fitting 18 is then mounted on the outlet and a conduit is installed to lead from the fitting to the service point.

The fitting 18 of my invention is preferably a hollow casting which has a circular portion 19 of a size to receive the outlet 13. The body 20 of the fitting is tubular and it has an opening through the inner wall of the circular portion. The body terminates in an end 21 which is offset from the circular portion and is preferably internally threaded to receive the end of a conduit 16. The circular portion of the fitting is provided with a screw 22 which can be turned into contact with the outlet and serves both as a means for grounding the fitting to the duct and for holding the fitting in a fixed relation to the outlet.

The extension to the service point is completed by the use of an outlet box 23 at the point and, while this box may have various forms, I prefer to use that shown in Figure 6. The box comprises a tubular body 24, the ends of which are closed by plates 25 having flanges 26 received in the ends of the body. One or both plates may be provided with a threaded opening 27 for the reception of the end of the conduit 16 and the body is provided with an outlet 28 at its top which extends upward toward the floor surface. An inexpensive box of the type described is made of a short section of pre-set duct having an outlet mounted in the wall thereof and such a box is illustrated in the drawing.

In some instances, it may develop that there are two points remote from the duct at which service is desired and that these points can be served by a single extension. In that situation, a conduit 16 may be led from the nearest outlet on the duct to one of the points at which a box 23 is installed. This box is provided with end plates, both of which have an opening 27, or one of the plates is solid and the other plate used has two openings, such a plate being shown in Figure 8 and designated 29. The wiring is then led through the conduit 16 into the box and then either across the box and out through a conduit 30 to the second box 31, or else the conduit 30 may be connected to the end plate of the box to which conduit 16 leads. These types of extension are both shown in Figure 1 and by the use of boxes of the kind described, the number of extensions required may be reduced.

When an extension is made by cutting the wall of the outlet, it will be desirable to replace the cap 15 by a cap of the construction shown in Figure 3 and designated 32. This cap has a top which lies exposed in the floor surface and a slotted neck 33 which enters the outlet. A screw 34 mounted in the top of the cap is threaded into a wedge nut 34 and by turning the screw, the nut may be moved to force that slotted end of the neck firmly into engagement with the outlet.

If it is desired to obtain service at an outlet provided with an extension, the connections are made in the usual way and the wiring is led up out of the outlet and into a standpipe 36 of usual construction mounted in the outlet. The lower end of the standpipe lies above the end of the opening into the hollow body of the fitting 18 and thus wiring may be led through the outlet both to the extension and to the standpipe.

I claim:

1. In an underfloor duct system, a fitting for connecting a tubular extension to an outlet of said system, which comprises a hollow elongated body having a ring portion at one end, the inner wall of the ring having an opening leading into the body.

2. In an underfloor duct system, a fitting for connecting a conduit to an outlet of said system, which comprises a hollow elongated body having a collar at one end with an opening through it to receive said outlet and an opening in the wall thereof leading into the body, said body having an internally threaded portion at the other end for reception of the end of said conduit.

3. In an underfloor duct system, a fitting for connecting a tubular extension to an outlet of said system, which comprises a hollow elongated body having a ring portion at one end, the inner wall of the ring having an opening leading into the body, the other end of the body being shaped to receive the end of said extension, said ends of the body being offset.

4. In an underfloor duct system, a duct embedded in the floor below the floor surface and having an outlet in the top wall thereof extending upward to the floor surface, and a hollow fitting within the floor and connected to said outlet between the top of the duct and the floor surface and communicating with the interior of the outlet, said fitting being formed for connection of a tubular member thereto.

5. In an underfloor duct system, a duct embedded in the floor below the floor surface and having an outlet at the top thereof extending toward the floor surface, and a fitting for making a connection to said outlet between the duct and the floor surface, said fitting comprising a hollow elongated body having an end portion shaped to conform to the outer contour of said outlet and having an opening leading to the interior of the body, and a second end portion provided with means for connection of the end of a tube to said fitting to communicate with the interior thereof.

HERVEY S. WALKER.